Patented Aug. 22, 1933

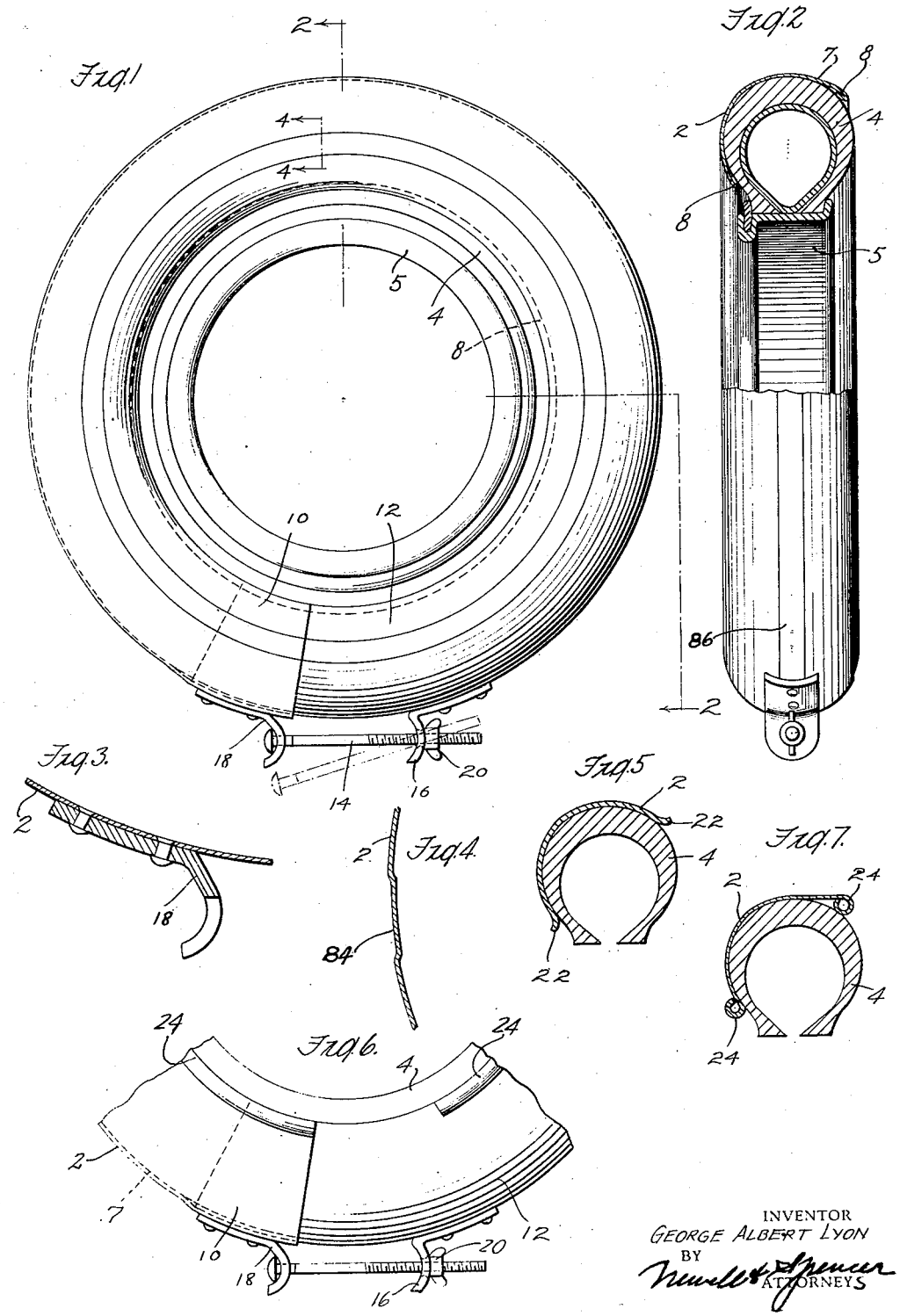

1,924,084

UNITED STATES PATENT OFFICE 1,924,084

COVER FOR SPARE TIRES

George Albert Lyon, Allenhurst, N. J., assignor to Lyon Incorporated, Asbury Park, N. J., a Corporation of Delaware Application May 21, 1928. Serial No. 279,292

19 Claims. (Cl. 150—54)

This invention relates to covers for spare tires carried upon automobiles.

The usual spare tire cover consists of a canvas casing coated with waterproofing material, and formed to fit the contour of the spare tire and carrier. These tire covers are unattractive in appearance and are subject to shrinkage so that they are difficult to apply to a tire after having been in use for a relatively short time. Such casings also often cannot be applied to a tire so that they will fit the tire smoothly. They also wear out quickly and are readily torn, particularly when struck by another car, as often happens under congested traffic conditions. They also do not constitute a satisfactory protection for the tire against damage in case of collision. The ordinary tire cover, since it is made of a highly flexible material, not only wrinkles readily, but, when applied to a tire, conforms to the projections or roughness on the tire so that it does not present a smooth outer surface.

The principal object of the present invention is to produce a cover for the spare tire of an automobile which has a highly attractive appearance, which may be readily applied to the tire, which is strong and durable in construction, which will protect the tire in a reliable manner against weather and damage from collision, and which will present a smooth outer surface at all times.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing—

Figure 1 is a view in front elevation illustrating a cover for spare tires embodying the invention;

Figure 2 is a view partly in side elevation and partly in vertical section taken substantially on the line 2—2 of Figure 1;

Figure 3 is a detail sectional view illustrating one of the parts of the fastening devices for securing the tire cover in position with relation to the tire;

Figure 4 is a detail sectional view taken substantially on the line 4—4 of Figure 1;

Figure 5 is a detail sectional view taken transversely through a tire and tire cover and illustrating a modified form of tire cover;

Figure 6 is a view in front elevation of a portion of a tire and tire cover, said tire cover embodying the invention in a still different form;

Figure 7 is a sectional view taken substantially on the line 7—7 of Figure 6.

The present invention embodies a relatively nonflexible cover made of sheet material formed into the proper shape to constitute a protective covering for the tire. The cover, although it is relatively stiff so that it will maintain its shape without any inside support, may have sufficient resiliency to enable it to be expanded and contracted in applying the same to and removing the same from a tire. The cover may be made of various materials, such as hard rubber, phenolic condensation product, or cloth impregnated with stiffening material, but is preferably formed of sheet metal. In actual practice, a cover made of sheet steel has been found to give highly satisfactory results.

In the construction shown in Figures 1 and 2 a tire cover 2 embodying the invention is shown as applied to a tire 4 mounted on a tire carrier 5 secured to the frame of an automobile, the entire periphery of the tire being free and unobstructed. The tire cover 2 consists of a sheet metal ring-shaped casing curved in cross section so as approximately to conform to the cross-sectional curvature of the periphery of the tire. As shown in Figure 2 the tire cover is curved in cross section so as to fit approximately the outer surface of the tire and is arranged to contact with the tire when in operating position. The tire cover shown in Figures 1 and 2 is arranged to cover the outer or exposed face of the tire lying on the outer side of the central plane of the tire and also extends for some distance across the peripheral surface of the tire upon the opposite side of this central plane. That portion of the tire cover extending to the right of the central plane of the tire as shown in Figure 2 is preferably turned inwardly toward the axis of the tire. The inner margin of the cover thus is given a diameter less than the diameter of the tire which enables the cover to retain itself in position upon the tire when applied thereto in the manner shown in these figures. The tire cover is provided at its margin with portions 8 reversely bent back against the body of the tire cover so as to form rounded edges which will not injure the operator when the cover is being applied to or removed from the tire.

The tire cover is made in ring-form and in the construction shown in Figures 1 and 2, the cover is not formed in a continuous integral ring but is interrupted to form end portions 10 and 12 which overlap each other in telescoping relation, as shown clearly in Figure 1. The ring is preferably made of metal which has a certain degree of resiliency and is arranged so that it will normally assume a diameter at its periphery somewhat less than the diameter of the periphery of the tire to which it is to be applied. In applying the cover to the tire the cover is expanded so that the marginal portion 7 of the same will pass over the periphery of the tire and the cover is then placed in the position shown in Figure 2, the sliding movement of the end portions 10 and 12, with relation to each other, permitting the ready expansion of the ring. When the ring is released the spring of the metal will contract the same upon the tire.

In order to hold the cover securely in place with relation to the tire, the cover is provided with fastening devices comprising a bolt indicated at 14 mounted in an opening in a bracket 16 secured to the cover, the opening in the bracket being considerably larger than the shank of the bolt so that the bolt may be displaced from the position shown in full lines in Figure 1 to the position shown in dotted lines. The head end of the bolt is arranged to be inserted in a slot in a bracket 18 secured to the end portion 10 of the cover, the head of the bolt engaging a concavely curved surface formed on the bracket. The fastening bolt is provided with a wing nut 20 arranged to be manipulated by the operator in applying the tire cover to the tire and detaching the cover therefrom. The projecting portion of the bracket 16 is preferably curved substantially as shown in Figure 1, the wing 20 engaging the convexly curved face of the bracket.

When the cover has been applied to the tire in the manner above described, the bolt 14 then occupying the dotted line position shown in Figure 1, the bolt is swung upwardly to engage the same in the slot in the bracket 18 and then the wing nut 20 is turned to draw together the brackets 16 and 18 and thereby cause relative movement of the end portions 10 and 12 of the cover in a direction to contract the cover upon the tire. The engagement of the head of the bolt in the convexly curved portion of the bracket 18 holds the bolt from becoming disengaged from the slot in said bracket and permits the slight angular movement between the bracket and bolt occurring during the tightening of the nut. The curved formation of the bracket 16 also permits the slight angular movement between this bracket and the bolt occurring during the tightening of the nut. When it is desired to detach the cover from the tire, the thumb nut 20 is partially unscrewed from the bolt by the operator so that the head of the bolt may be released from the slot in the bracket 18. This enables the cover readily to be expanded sufficiently to enable the portion 7 of the cover to pass over the peripheral portion of the tire.

By means of the fastening devices above described, the cover may be tightened upon the periphery of the tire with sufficient pressure to hold the cover on the tire even if the cover were so formed that a portion thereof at the right of the central plane of the tire (Figure 2) were substantially of the same diameter as the periphery of the tire. Preferably, however, the cover is turned inwardly on this side of the central plane of the tire so as to insure its being held securely in position by securing the cover tightly upon the periphery of the tire. In this manner, the cover is prevented from having any movement whatever with relation to the tire so that there will be no rattling of the cover, nor chafing of the tire, when the cover is applied.

It will be noted on inspection of Figure 3, that the fastening devices which secure the brackets 16 and 18 to the tire cover are counter-sunk into the sheet metal of the cover on the inner side thereof, so that the cover presents a smooth inner surface to the tire and the overlapping portions of the cover may slide readily with relation to each other.

The tire cover may be made of any sheet material found suitable for the purpose, but is preferably made of sheet steel, as stated above.

As shown in Figure 5, the tire cover 2 is formed of somewhat heavier sheet material than in the construction shown in Figures 1, 2, 3 and 4. The marginal portions 22 of the cover shown in Figure 5, instead of being reversely bent down upon the body of the cover, are turned outwardly to a slight degree as clearly shown in this figure.

In the construction shown in Figure 7, the tire cover is provided with cylindrical beads indicated at 24 along each margin, these beads being formed by turning or curling the sheet metal into a cylindrical curl. In order that these beads may not interfere with the interfitting of the end portions 10 and 12 of the cover where they overlap, the beads may be cut away on one of the end portions of the cover for some distance from the extremity of said end portion, as shown in Figure 6, the beads being indicated by dotted lines in this figure.

Figure 4 of the drawing shows a construction of the cover especially for the purpose of enabling the same to be ornamented with contrasting colors. In the construction shown in this figure, the cover is provided with a groove 84 to receive a stripe of enamel or other decorative material contrasting with the color of the surfaces of the adjacent portions of the cover. The cover may be provided with grooves for the reception of decorative material both on the side of the cover as shown in Figure 1 and on the peripheral portion of the cover as shown in Figure 2, the groove in this figure being indicated at 86.

The tire cover above described has the advantages that it is strong and durable in construction and that it will efficiently protect the tire both from the weather and from injury to which the tire may be subjected in case of collision by contact of another car with the tire. The cover being made of relatively stiff sheet material, will maintain its shape so that it will always present a smooth attractive outer surface. When made of sheet metal, the principal parts of the cover may be stamped out with suitable dies, thereby enabling the covers to be made in quantities at a relatively small cost. The cover may be enameled in any desired color, and when made of sheet metal, may be plated with nickel. A cover of the construction shown in the drawing of this application will be highly attractive in appearance and will add greatly to the beauty of the car.

The cover in each case may be quickly and easily applied to the tire and as quickly and easily detached therefrom.

It is to be understood that the terms "ring", "annular", "ring-shaped", and similar terms employed in the specification and claims to define applicant's cover are not limited to a construction in which the cover or the portion or portions thereof defined by these terms have the form of a complete ring, but that these terms also apply to constructions in which the cover or the portion or portions thereof defined have the form of a part of a ring only.

Having explained the nature and object of the invention and having specifically described a construction embodying the invention in its preferred form, what is claimed is:

1. A unitary metallic automobile spare tire cover formed to cover the exposed outer side wall and tread portions of the tire when mounted on an automobile and having an inturned resilient marginal edge extending about substantially more than 180° of the tire for engaging over the rear side of the tread and contractible to retain the cover against lateral displacement when it is on the tire.

2. An automobile tire cover comprising an arcuate and radially non-collapsible ring made from metal or the like and of convexly curved cross sectional form so shaped and proportioned as to enable it to be bodily pushed onto the tire and to thereafter substantially cover the exposed outer side wall and tread portions of the tire when mounted on an automobile leaving the rear side of the tire exposed, said ring having a rear resilient marginal edge portion of lesser diameter than that of the tire and formed to overhang the tire tread at the rear of the tire so as to prevent lateral displacement of the cover, said edge extending about substantially more than 180° of the tire periphery and being circumferentially contractible into cover retaining engagement with the tire.

3. An automobile tire cover comprising an arcuate ring made from non-collapsible material and of convexly curved cross sectional form so shaped and proportioned as to enable it to be bodily pushed onto the tire and to thereafter substantially cover the exposed outer side wall and tread portions of the tire when mounted on an automobile leaving the rear side of the tire exposed, said ring having a rear marginal edge portion of lesser diameter than that of the tire and formed to extend about more than one half of the tire periphery and to overhang the tire tread at the rear of the tire so as to prevent lateral displacement of the cover, and having an opening at its bottom which permits said rear marginal portion to go over the outermost periphery of the tire tread and to thereafter contract into cover retaining position.

4. In an automobile spare tire cover, a split ring for snugly fitting and extending about substantially more than one half of the outer periphery of a spare tire including a relatively deep portion which portion is relatively rigid in a lateral sense and affords strong resistance to stretching, and an arcuate rim-like relatively rigid portion associated with said side portion and provided with a relatively rigid, in a lateral sense, inwardly disposed margin affording resistance to stretching in a tensional sense, the depth of said margin being shorter than the depth of said side portion and these two depths being so relatively proportioned to each other as to enable the shoving and the application of the cover to the tire, said side portion having substantial covering area for one side of the tire as compared with the area covered by said margin.

5. In a substantially non-collapsible automobile spare tire cover made from metal or the like of convexly curved cross section adapted to be bodily pushed over the exposed portion of the tire and into a snug fit therewith, an inwardly projecting circumferentially extending retaining means formed to extend continuously about substantially more than one half of the outer tire periphery and being of relatively narrow width and expansible and contractible into retaining engagement with the rear side of the tire tread.

6. In an automobile tire cover, a resiliently expansible and contractible split rim for disposition over the tread of a spare tire formed from relatively stiff material and being of such circumferential length and cross sectional shape as to enable it to be shoved over the tread and to embrace the tire, said split rim having its front marginal portion formed to extend inwardly farther than does its rear portion whereby the front marginal portion of the rim overhangs the front side of the tread said rear portion being relatively narrow and extending inwardly of the outer periphery of the tire and about substantially more than one half of said tire periphery.

7. An automobile tire cover comprising a metallic arcuate ring so shaped and proportioned as to enable it to be placed over the outer periphery of the tire and to thereafter substantially cover the exposed outer side wall and tread portions of the tire leaving the rear side exposed, said ring having at its rear side inwardly projecting and circumferentially extending resilient holding means disposed about substantially more than one half of the tire periphery and contractible into retaining engagement with the tire, and tightening means for holding the cover in said retained engagement.

8. In an automobile tire cover, a resiliently expansible and contractible split rim for disposition over the tread of a spare tire formed from relatively stiff material and being of such circumferential length and cross sectional shape as to enable it to be placed over the tread and to embrace the tire, said split rim having its front marginal portion formed to extend inwardly farther than does its rear portion whereby the front marginal portion of the rim overhangs the front side of the tread, and means for connecting the ends of said split rim to secure same in proper tire protecting position on the tire said rear portion being relatively narrow and extending inwardly of the outer periphery of the tire and about substantially more than one half of said tire periphery.

9. An automobile spare tire cover made from metal or the like for protecting and snugly fitting a spare tire including a side portion formed to be disposed over the outer side wall of the spare tire, said side portion maintaining itself in substantially the same annular form both while in use and while off the tire, and an arcuate rim-like portion associated therewith to be disposed over the outer periphery of the tire and having an inherent tendency to resist pressure as it is placed into position on the tire, said rim-like portion being so shaped and proportioned that when in tire protecting position an inner and contractible part of the same will be spaced inwardly from the outer periphery of the tire such a distance as to hold the cover in position and yet permit of the moving of the rim portion into proper tire protecting position over the outer periphery of the tire said rim-like portion including its said inner part extending around substantially more than one half of the tire periphery to enable said inner part when in engagement with the tire to retain the cover against upward displacement from the tire.

10. An automobile spare tire cover made from metal or the like for protecting a spare tire including a substantially continuous arcuate side portion formed to be disposed over the outer side wall of a spare tire and to maintain itself in substantially the same annular form both while in use and while off the tire and a rim portion of arcuate form associated with said side portion and projecting laterally from it over the median plane of the tire and being of a radius to enable it to closely fit over the tire and to extend over substantially the entire width of the tire tread as well as about substantially more than one-half of the outer periphery of the tire, said rim portion having an inner circumferentially extending marginal part thereof formed to extend inwardly from said rim portion so as to engage over the other and rear side of the tire periphery to a sufficient extent as to retain the cover on the tire in proper tire protecting position and yet being expansible and of sufficiently narrow width as to permit of the ready pushing of said rim portion over the outer periphery of the tire and into proper tire protecting position.

11. In an automobile spare tire cover of relatively rigid convexly curved cross section formed to be bodily pushed over the tread and exposed portion of the tire, an inwardly projecting circumferentially extending retaining marginal portion of relatively narrow width and expansible to be pushed bodily from an outer side of the tire over the tire tread and contractible into retaining engagement with the rear side of the tire periphery, said portion extending substantially around more than one half of the tire periphery.

12. In an automobile spare tire cover of relatively rigid convexly curved cross section formed to be bodily pushed over the tread and exposed portion of the tire, an inwardly projecting circumferentially extending retaining marginal portion of relatively narrow width and expansible to be pushed bodily from an outer side of the tire over the tire tread and contractible into retaining engagement with the rear side of the tire periphery, said portion extending substantially around more than one half of the tire periphery and provided with means for holding said portion in cover retaining engagement.

13. In an automobile spare tire cover of relatively rigid convexly curved cross section formed to be bodily pushed over the tread and exposed portion of the tire, an inwardly projecting circumferentially extending retaining marginal portion of relatively narrow width and expansible to be pushed bodily from an outer side of the tire over the tire tread and contractible into retaining engagement with the rear side of the tire periphery, said portion extending substantially around more than one half of the tire periphery and including a bead-like member for contacting the spare tire at the rear side of its outer periphery.

14. In an automobile spare tire cover, a split ring for snugly fitting and extending about substantially more than one-half the outer periphery of a spare tire including a relatively deep portion which portion is relatively rigid in a lateral sense and affords strong resistance to stretching, and an arcuate rim-like relatively rigid portion associated with said side portion and provided with a relatively rigid, in a lateral and provided margin affording resistance to stretching in a tensional sense, the depth of said margin being shorter than the depth of said side portion and these two depths being so relatively proportioned to each other as to enable the shoving and the application of the cover to the tire, said side portion having substantial covering area for one side of the tire as compared with the area covered by said margin, said split ring providing said margin with relatively movable ends at the lower half of the cover to enable said margin to be brought into cover retaining engagement with the tire.

15. In an automobile spare tire cover, a ring for snugly fitting and extending about substantially more than one-half the outer periphery of a spare tire including a relatively deep portion which portion is relatively rigid in a lateral sense and affords strong resistance to stretching, and an arcuate rim-like relatively rigid portion associated with said side portion and provided with a relatively rigid, in a lateral sense, inwardly disposed margin affording resistance to stretching in a tensional sense, the depth of said margin being shorter than the depth of said side portion and these two depths being so relatively proportioned to each other as to enable the shoving and the application of the cover to the tire, said side portion having substantial covering area for one side of the tire as compared with the area covered by said margin, said margin being split to permit of its expansion and contraction in the application and removal of the cover to and from the tire.

16. A spare tire cover made from metal or the like for protecting a spare tire mounted on a tire carrier including a single side portion substantially circumferentially rigid and of arcuate shape formed to cover the outer side of the tire and a rim to cover the periphery of the tire and of sufficient length to extend around substantially more than one-half of the periphery of said tire, said side portion aiding at the outer side of the tire to retain said rim from radial spreading with respect to said side portion, said rim including a portion projecting laterally from said side portion across the median plane of the tire and being of a radius sufficient to enable it to snugly fit over the tire, and means associated with said rim portion for retaining said rim portion on said tire, said means terminating at such a distance inwardly from the outer periphery of said tire at the other and inner side of said spare tire as to serve as a retaining means after said cover is in proper tire protecting position and at the same time being resiliently expansible to permit of the shoving of said side and rim portions substantially bodily into and out of said proper tire protecting position, said means also being substantially circumferentially continuous about the rear side of the outer periphery of the tire for cover retaining cooperation with substantially more than 180° of said periphery.

17. A metallic spare tire cover having a metallic outer side portion for disposition over an outer side wall of the tire, and a metallic tread covering portion for disposition over the tread of the tire having its inner edge of a normally smaller diameter than that of the outermost periphery of the tire and leaving the inner side wall of the tire exposed and provided to the rear of the median plane of the tire with resilient cover retaining means extending over the rear side of the tire tread and cooperating with said tread portion to draw the outer side covering portion toward the tire and so as to enable the cover to accommodate variations in size and contour of the tire and to hold the cover in retaining engagement with the tire, said resilient cover retaining means including a substantially circumferentally continuous relatively shallow portion about the rear side of the tire tread and expansible and contractible into and out of cover retaining engagement with the tire.

18. An automobile spare tire cover made from metal or the like and of an approximately fixed self-sustained shape having a curved outer side portion for disposition over the exposed outer side wall of the tire and a curved tread covering portion for disposition over the tread of the tire and a curved inturned retaining rear portion having a relatively narrow width for retaining the cover on the tire, said portions extending substantially, continuously and cicumferentially all the way around the tire, and having means providing an approximately uniform resilient holding pressure distributed about the tire whereby the cover may be held in resilient holding cooperation with tires having various shapes and sizes.

19. An automobile spare tire cover of an approximately fixed self-sustained shape having a curved outer side portion for disposition over the exposed outer side wall of the tire and a curved tread covering portion for disposition over the tread of the tire and a curved inturned retaining rear portion having a relatively narrow width for retaining the cover on the tire, said portions extending substantially, continuously and circumferentially all the way around the tire, and having means providing an approximately uniform resilient holding pressure distributed about the tire whereby the cover may be held in resilient holding cooperation with tires having various shapes and sizes, and mechanically operated means for circumferentially contracting said rear portion into holding cooperation with the tire.

GEORGE ALBERT LYON.